(12) United States Patent
Yamashita

(10) Patent No.: US 11,648,719 B2
(45) Date of Patent: May 16, 2023

(54) PLASTICIZATION DEVICE, THREE-DIMENSIONAL SHAPING DEVICE, AND INJECTION MOLDING DEVICE

(71) Applicant: SEIKO EPSON CORPORATION, Tokyo (JP)

(72) Inventor: Seiichiro Yamashita, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/943,560

(22) Filed: Jul. 30, 2020

(65) Prior Publication Data

US 2021/0031423 A1 Feb. 4, 2021

(30) Foreign Application Priority Data

Aug. 1, 2019 (JP) .............................. JP2019-142062

(51) Int. Cl.
| | |
|---|---|
| *B29C 45/50* | (2006.01) |
| *B29C 45/60* | (2006.01) |
| *B29C 45/62* | (2006.01) |
| *B29C 45/20* | (2006.01) |
| *B29C 45/74* | (2006.01) |
| *B29C 45/72* | (2006.01) |
| *B29C 64/209* | (2017.01) |

(52) U.S. Cl.
CPC .......... *B29C 45/5008* (2013.01); *B29C 45/20* (2013.01); *B29C 45/60* (2013.01); *B29C 45/62* (2013.01); *B29C 45/74* (2013.01); *B29C 2045/504* (2013.01); *B29C 2045/7271* (2013.01)

(58) Field of Classification Search
CPC ..... B29C 45/20; B29C 45/5008; B29C 45/60; B29C 48/02; B29C 48/2513; B29C 48/2567; B29C 48/2568
See application file for complete search history.

(56) References Cited

U.S. PATENT DOCUMENTS

| | | | | |
|---|---|---|---|---|
| 2,705,342 | A * | 4/1955 | Hendry ................. | B29C 48/832 |
| | | | | 425/156 |
| 3,425,096 | A * | 2/1969 | Morse .................... | B29C 45/52 |
| | | | | 264/328.14 |
| 3,446,889 | A * | 5/1969 | Draudt ................ | B29C 45/2803 |
| | | | | 264/328.13 |
| 3,866,669 | A | 2/1975 | Gardiner | |

(Continued)

FOREIGN PATENT DOCUMENTS

| | | | | |
|---|---|---|---|---|
| CN | 102791460 | | 11/2012 | |
| CN | 103737873 | A * | 4/2014 | ......... B29C 45/7312 |

(Continued)

OTHER PUBLICATIONS

Machine Translation CN103737873A (Year: 2014).*

*Primary Examiner* — Matthew J Daniels
*Assistant Examiner* — Wayne K. Swier
(74) *Attorney, Agent, or Firm* — Workman Nydegger

(57) ABSTRACT

A plasticization device includes: a cylinder having a supply port through which a material is supplied; a spiral screw configured to rotate inside the cylinder; a nozzle configured to discharge the material plasticized inside the cylinder; a heating unit provided between the supply port in the cylinder and the nozzle; a screw drive unit including a motor configured to rotate the screw; and a case configured to accommodate at least a part of the screw drive unit and having a first refrigerant flow path.

9 Claims, 12 Drawing Sheets

(56) References Cited

U.S. PATENT DOCUMENTS

| | | | |
|---|---|---|---|
| 3,944,191 A | | 3/1976 | Kasamatsu |
| 3,954,366 A | | 5/1976 | Fields |
| 4,908,169 A | * | 3/1990 | Galic ..................... B29C 45/60 264/328.14 |
| 5,121,329 A | | 6/1992 | Crump |
| 2003/0075833 A1 | * | 4/2003 | Thomson ............ B29C 45/1645 264/328.17 |
| 2011/0159139 A1 | | 6/2011 | Galati et al. |
| 2016/0114514 A1 | * | 4/2016 | Hakoda ................... B29C 45/78 425/144 |
| 2017/0008230 A1 | | 1/2017 | Yuyama |
| 2017/0291364 A1 | * | 10/2017 | Womer ................ B29C 48/501 |
| 2018/0236705 A1 | | 8/2018 | Conrad |
| 2019/0168455 A1 | | 6/2019 | Besim et al. |
| 2020/0324337 A1 | | 10/2020 | Lieberwirth et al. |
| 2020/0338824 A1 | | 10/2020 | Cardon et al. |
| 2021/0031422 A1 | | 2/2021 | Yamashita |
| 2021/0031423 A1 | | 2/2021 | Yamashita |

FOREIGN PATENT DOCUMENTS

| | | | |
|---|---|---|---|
| JP | 09-070864 | 3/1997 | |
| JP | 3052603 | 7/1998 | |
| JP | 10-249892 | 9/1998 | |
| JP | 2000-127214 | 5/2000 | |
| JP | 2004-314399 | 11/2004 | |
| JP | 2013-184387 | 9/2013 | |
| WO | 2015/129733 | 9/2015 | |
| WO | WO-2018204844 A1 * | 11/2018 | ............. B29C 41/08 |

\* cited by examiner

PLASTICIZATION DEVICE, THREE-DIMENSIONAL SHAPING DEVICE, AND INJECTION MOLDING DEVICE

The present application is based on, and claims priority from JP Application Serial Number 2019-142062, filed Aug. 1, 2019, the disclosure of which is hereby incorporated by reference herein in its entirety.

BACKGROUND

1. Technical Field

The present disclosure relates to a plasticization device, a three-dimensional shaping device, and an injection molding device.

2. Related Art

For example, JP-A-2013-184387 discloses an injection molding machine which includes: a cylinder including a front cylindrical portion provided with a nozzle and a heater and a rear cylindrical portion provided with a resin supply port; a cylinder holding member configured to hold the rear cylindrical portion; a screw configured to rotate inside the cylinder; and a motor configured to rotate the screw. In this injection molding machine, a refrigerant flow path is provided inside the cylinder holding member.

With the use of the device described above at a predetermined amount of time, a temperature of the motor may be increased, an efficiency of the motor may be decreased, the screw may not be able to rotate at a desired rotation speed, and a desired amount of material may not be discharged from the nozzle.

SUMMARY

According to one aspect of the present disclosure, a plasticization device is provided. The plasticization device includes: a cylinder having a supply port through which a material is supplied; a spiral screw configured to rotate inside the cylinder; a nozzle configured to discharge the material plasticized inside the cylinder; a heating unit provided between the supply port in the cylinder and the nozzle; a screw drive unit including a motor configured to rotate the screw; and a case configured to accommodate at least a part of the screw drive unit and having a first refrigerant flow path.

DESCRIPTION OF EXEMPLARY EMBODIMENTS

A. First Embodiment

Figure 1:
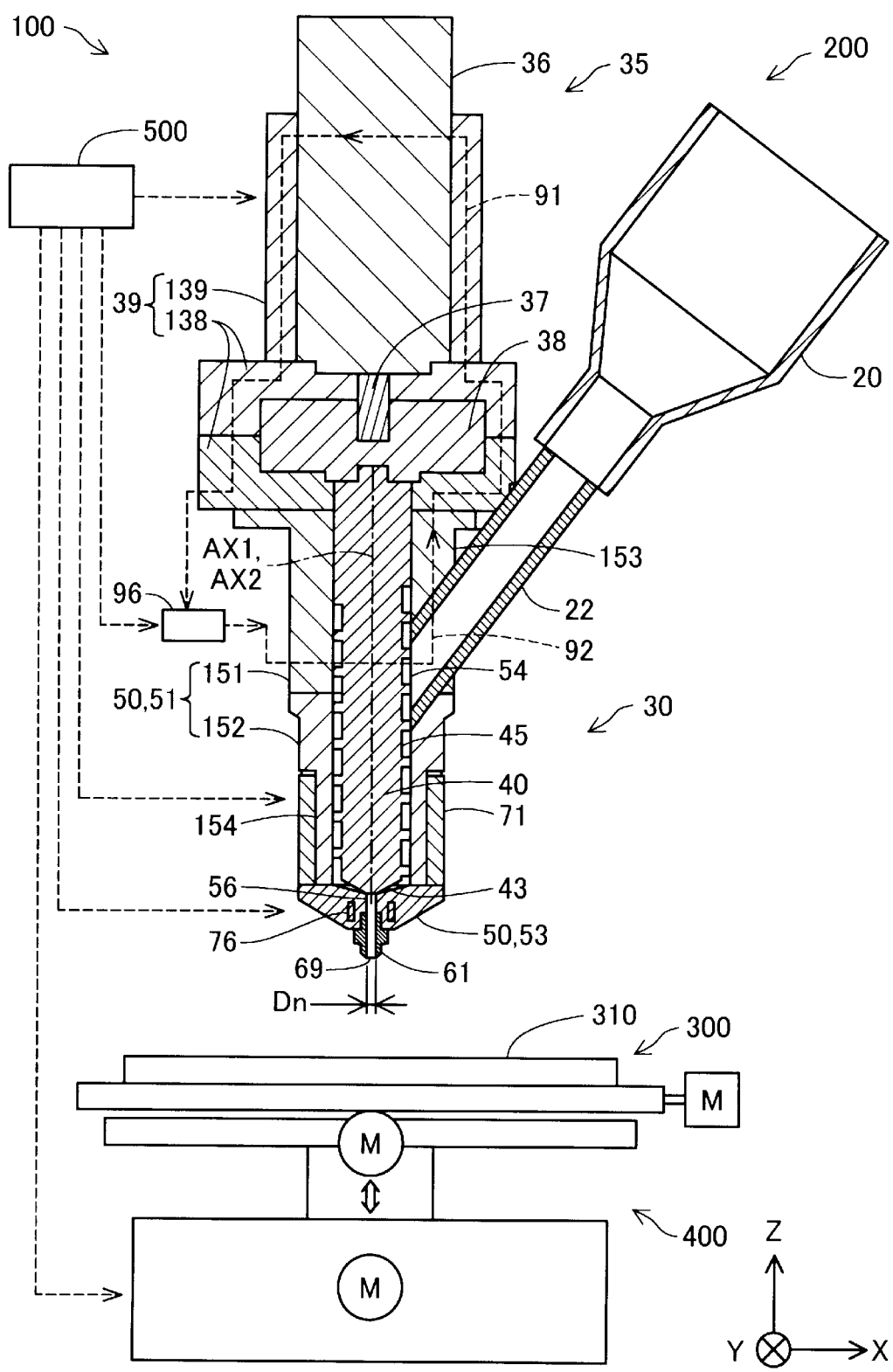
FIG. 1 is a diagram showing a schematic configuration of a three-dimensional shaping device according to a first embodiment.

FIG. 1 is a diagram showing a schematic configuration of a three-dimensional shaping device 100 according to a first embodiment. FIG. 1 shows arrows along X, Y, and Z directions orthogonal to each other. The X direction and the Y direction are directions along a horizontal direction, and the Z direction is a direction along a vertical direction. In other figures, the arrows along the X, Y, and Z directions are appropriately shown. The X, Y, Z directions in FIG. 1 and the X, Y, Z directions in other figures represent the same direction.

The three-dimensional shaping device 100 according to the present embodiment includes a shaping unit 200, a stage 300, a moving mechanism 400, and a control unit 500. Under control of the control unit 500, the three-dimensional shaping device 100 shapes a three-dimensional shaped object in which layers of a shaping material are stacked on a shaping surface 310 by driving the moving mechanism 400 to change a relative position between a nozzle hole 69 and the shaping surface 310 while discharging the shaping material from the nozzle hole 69 provided in the shaping unit 200 toward the shaping surface 310 of the stage 300. The shaping material is sometimes referred to as a molten material. A detailed configuration of the shaping unit 200 will be described later.

The moving mechanism 400 changes the relative position between the nozzle hole 69 and the shaping surface 310 as described above. In the present embodiment, the moving mechanism. 400 supports the stage 300, and changes the relative position between the nozzle hole 69 and the shaping surface 310 by moving the stage 300 with respect to the shaping unit 200. The moving mechanism 400 according to the present embodiment is implemented by a three-axis positioner that moves the stage 300 in three axial directions of the X, Y, and Z directions by drive forces of three motors. Each motor is driven under the control of the control unit 500. The moving mechanism 400 may be configured to change the relative position between the nozzle hole 69 and the shaping surface 310 by, instead of moving the stage 300, moving the shaping unit 200 without moving the stage 300. In addition, the moving mechanism 400 may be configured to change the relative position between the nozzle hole 69 and the shaping surface 310 by moving both the stage 300 and the shaping unit 200.

The control unit 500 is implemented by a computer including one or more processors, a main storage device, and an input and output interface for inputting and outputting signals to and from the outside. In the present embodiment, the control unit 500 controls operations of the shaping unit 200 and the moving mechanism 400 by the processor executing a program or a command read in the main storage device, so as to execute a shaping processing for shaping a three-dimensional shaped object. The operations include changing a three-dimensional relative position between the shaping unit 200 and the stage 300. The control unit 500 may be implemented by a combination of a plurality of circuits instead of the computer.

The shaping unit 200 includes a material supply unit 20 that is a material supply source and a plasticization unit 30 that plasticizes a material supplied from the material supply unit 20 to form a shaping material so as to discharge the shaping material from the nozzle hole 69. The term "plasticize" means that a material having thermoplasticity is heated and melted. The term "melt" not only means that the material having thermoplasticity is heated to a temperature equal to or higher than a melting point to become a liquid, but also means that the material having thermoplasticity is softened by being heated to a temperature equal to or higher than a glass transition point to exhibit fluidity. The plasticization unit 30 may also be referred to as a plasticization device.

A material in a state of pellets, powder, or the like is accommodated in the material supply unit 20. According to the present embodiment, a pellet-shaped ABS resin is used as the material. The material supply unit 20 according to the present embodiment is implemented by a hopper. Below the material supply unit 20, a supply pipe 22 is provided for coupling the material supply unit 20 and the plasticization unit 30. The material supply unit 20 supplies the material to the plasticization unit 30 via the supply pipe 22. In the present embodiment, the material supply unit 20 and the supply pipe 22 each have a cylindrical shape. The material supply unit 20 and the supply pipe 22 are formed of an aluminum alloy. At least one of the material supply unit 20 and the supply pipe 22 is not formed of an aluminum alloy, but may be formed of another metal material such as stainless steel, or may be formed of a resin material or a ceramic material. The material supply unit 20 and the supply pipe 22 may be formed of different materials.

The plasticization unit 30 includes a cylinder 50 having a supply port 54 through which a material is supplied from the material supply unit 20, a screw 40 configured to rotate inside the cylinder 50, a screw drive unit 35 configured to rotate the screw 40, a first heating unit 71 configured to heat the material supplied into the cylinder 50, and a nozzle 61 having the nozzle hole 69 configured to discharge the shaping material. In the present embodiment, the screw drive unit 35, the cylinder 50, and the nozzle 61 are disposed in this order from an upper side to a lower side. The plasticization unit 30 melts at least a part of a solid-state material supplied from the material supply unit 20 by the rotation of the screw 40 and the heating of the first heating unit 71 to convert the material into a paste-shaped shaping material having fluidity, so as to discharge the material from the nozzle hole 69.

The cylinder 50 includes a main body portion 51 and a nozzle fixing portion 53 provided at a lower end of the main body portion 51. The main body portion 51 has a cylindrical shape centered on a central axis AX1. The main body portion 51 is disposed such that the central axis AX1 is along the Z direction. The main body portion 51 includes a first portion 151 and a second portion 152 in this order from an upper end. An outer peripheral side surface of the first portion 151 is referred to as a first outer peripheral portion 153, and an outer peripheral side surface of the second portion 152 is referred to as a second outer peripheral portion 154. The first outer peripheral portion 153 is provided with the supply port 54 through which the material is supplied. The supply pipe 22 is coupled to the supply port 54. An upper end of the first portion 151 is formed in a flange shape. The screw drive unit 35 is fixed to the upper end of the first portion 151. The first heating unit 71 to be described later is provided on the second outer peripheral portion 154. The nozzle fixing portion 53 is fixed to a lower end of the second portion 152. The nozzle fixing portion 53 has a disc shape. A through hole 56 penetrating the nozzle fixing portion 53 along the Z direction is provided at a center of the nozzle fixing portion 53. The nozzle 61 is coupled to a lower end of the through hole 56.

In the present embodiment, the first portion 151, the second portion 152, and the nozzle fixing portion 53 are each formed of stainless steel. In the present embodiment, the first portion 151 and the second portion 152 are integrally formed. For example, the first portion 151 and the second portion 152 can be integrally formed by bonding the first portion 151 and the second portion 152 using a metal bonding technique such as diffusion bonding or hot isostatic press (HIP). The first portion 151 and the second portion 152 may be integrally formed using a three-dimensional shaping technique. At least one of the first portion 151 and the second portion 152 is not formed of stainless steel, but may be formed of another metal material such as a titanium alloy, or may be formed of a resin material or a ceramic material. The first portion 151 and the second portion 152 may be formed of different metal materials.

The screw 40 is accommodated in the cylinder 50. More specifically, the screw 40 is accommodated in a space surrounded by the main body portion 51 of the cylinder 50, the nozzle fixing portion 53 of the cylinder 50, and a case 39 of the screw drive unit 35 to be described later. The screw 40 has a shaft shape centered on a central axis AX2. The center axis AX2 of the screw 40 is disposed along the central axis AX1 of the main body portion 51 of the cylinder 50. An upper end of the screw 40 is coupled to the screw drive unit 35. A tip end portion 43 of the screw 40 is positioned in a vicinity of the through hole 56. Spiral groove portions 45 centered on the central axis AX2 are provided on side surface portions of the screw 40. The groove portions 45 are continuously provided from a portion positioned above the supply port 54 in the screw 40 to the tip end portion 43 of the screw 40. Spiral flight portions 46 for separating the groove portions 45 are provided between the groove portions 45. In the present embodiment, the screw 40 is formed of stainless steel subjected to a quenching treatment. The screw 40 is not formed of the stainless steel subjected to the quenching treatment, but may be formed of another metal material such as a titanium alloy, or may be formed of a resin material or a ceramic material. A specific configuration of the groove portion 45 of the screw 40 will be described later.

The screw drive unit 35 includes a drive motor 36, a speed reducer 38, and the case 39. The case 39 includes a gear case portion 138 and a motor case portion 139. The gear case portion 138 is fixed to the upper end of the first portion 151 of the cylinder 50. The gear case portion 138 has a rectangular parallelepiped shape. The speed reducer 38 is accommodated inside the gear case portion 138. The motor case portion 139 is fixed to an upper surface of the gear case portion 138. The motor case portion 139 has a cylindrical shape. The drive motor 36 is accommodated in a hollow portion of the motor case portion 139. In the present embodiment, a servomotor is used as the drive motor 36. In the present embodiment, the speed reducer 38 is implemented by a gear or the like. The drive motor 36 is driven under the control of the control unit 500. A rotation shaft 37 of the drive motor 36 is coupled to an upper end portion of the screw 40 via the speed reducer 38. Due to torque applied from the drive motor 36 via the speed reducer 38, the screw 40 rotates centered on the central axis AX2 inside the cylinder 50. For example, a stepping motor may be used as the drive motor 36. The speed reducer 38 may be implemented by a pulley, a belt, or the like. The screw drive unit 35 may not include the speed reducer 38 and the gear case portion 138, and the rotation shaft 37 of the drive motor 36 may be coupled to the upper end portion of the screw 40. The drive motor 36 may be simply referred to as a motor.

The first heating unit 71 is provided on the second outer peripheral portion 154 and is positioned between the supply port 54 and the nozzle 61. The phrase "provided on the second outer peripheral portion 154" means to include both being provided along an outer peripheral surface of the second outer peripheral portion 154 and being embedded in the second outer peripheral portion 154. In the present embodiment, the first heating unit 71 is provided along the outer peripheral surface of the second outer peripheral portion 154. A temperature of the first heating unit 71 is controlled by the control unit 500. For example, a temperature sensor may be provided in the first heating unit 71, and the control unit 500 may control the temperature of the first heating unit 71 using the temperature acquired by the temperature sensor. A detailed configuration of the first heating unit 71 will be described later. The first heating unit 71 is sometimes simply referred to as a heating unit.

In the present embodiment, a second heating unit 76 configured to heat the nozzle 61 is embedded in the nozzle fixing portion 53. A temperature of the second heating unit 76 is controlled by the control unit 500. For example, a temperature sensor may be provided in the second heating unit 76, and the control unit 500 may control the temperature of the second heating unit 76 using the temperature acquired by the temperature sensor. Since a temperature of the shaping material in a vicinity of the nozzle 61 can be increased by the second heating unit 76, the fluidity of the material discharged from the nozzle hole 69 can be increased.

A first refrigerant flow path 91 is provided inside the case 39. In the present embodiment, the first refrigerant flow path 91 is provided in a three-dimensional path through both an inside of the gear case portion 138 and an inside of the motor case portion 139. The first refrigerant flow path 91 is formed by providing a hole having a three-dimensional path in the gear case portion 138 and the motor case portion 139. For example, the gear case portion 138 and the motor case portion 139 provided with the hole having the three-dimensional path can be manufactured using a three-dimensional shaping technique. One end of the first refrigerant flow path 91 is coupled, via a pipe or the like, to a refrigerant supply unit to be described later. The other end of the first refrigerant flow path 91 is coupled to a second refrigerant flow path 92 to be described later. The first refrigerant flow path 91 may be referred to as a first cooling unit.

In the present embodiment, the cylinder 50 is provided with the second refrigerant flow path 92 through which a refrigerant flows. The second refrigerant flow path 92 is provided inside the first portion 151 through a three-dimensional path passing through a vicinity of the supply port 54. The second refrigerant flow path 92 is formed by providing a hole having a three-dimensional path in the first portion 151. For example, the first portion 151 provided with the hole having the three-dimensional path can be manufactured using a three-dimensional shaping technique. One end of the second refrigerant flow path 92 is coupled to the first refrigerant flow path 91. The other end of the second refrigerant flow path 92 is coupled to the refrigerant supply unit 96 via a pipe or the like. A detailed configuration of the second refrigerant flow path 92 will be described later. The second refrigerant flow path 92 may be referred to as a second cooling unit.

The refrigerant supply unit 96 is implemented by a chiller that circulates the refrigerant into the first refrigerant flow path 91 and the second refrigerant flow path 92, and removes heat of the refrigerant flowing through the first refrigerant flow path 91 and the second refrigerant flow path 92. In the present embodiment, the refrigerant supplied from the refrigerant supply unit 96 flows through the second refrigerant flow path 92 and the first refrigerant flow path 91 in this order. The refrigerant supply unit 96 is driven under the control of the control unit 500. In the present embodiment, water is used as the refrigerant. As the refrigerant, for example, oil or air may be used instead of water. Only the second refrigerant flow path 92 may be coupled to the refrigerant supply unit 96. In this case, for example, the refrigerant flowing from the second refrigerant flow path 92 to the first refrigerant flow path 91 may be discharged to the outside without being circulated into the refrigerant supply unit 96.

The nozzle 61 is provided on a lower surface of the nozzle fixing portion 53 of the cylinder 50. The nozzle hole 69 is provided in a tip end portion of the nozzle 61. The nozzle hole 69 communicates with the through hole 56 of the nozzle fixing portion 53. The shaping material flowing from the through hole 56 into an internal flow path of the nozzle 61 is discharged from the nozzle hole 69. In the present embodiment, an opening shape of the nozzle hole 69 is a circle. A diameter of an opening portion of the nozzle hole 69 is referred to as a nozzle diameter Dn. The opening shape of the nozzle hole 69 is not limited to a circle, and may be a square or the like. When the opening shape of the nozzle hole 69 is a square, a length of one side of the square is referred to as the nozzle diameter Dn. The opening shape of the nozzle hole 69 may be a polygon other than the square.

Figure 2:
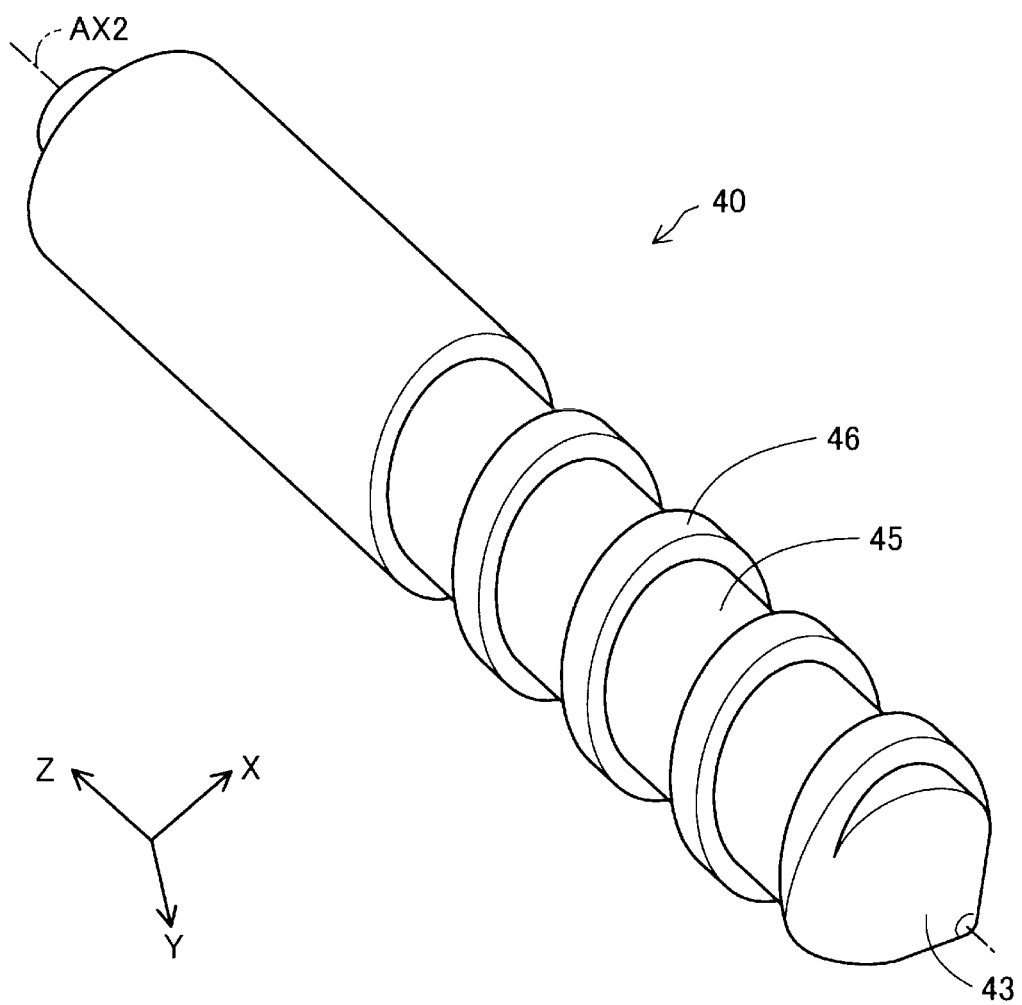
FIG. 2 is a perspective view showing a configuration of a groove portion of a screw according to the first embodiment.

FIG. 2 is a perspective view showing a configuration of the groove portion 45 of the screw 40 according to the present embodiment. In FIG. 2, the central axis AX2 of the flat screw 40 is shown by a dashed line. The spiral groove portions 45 centered on the central axis AX2 are provided on the side surface portions of the screw 40. The groove portions 45 are continuously provided to the tip end portion 43 of the screw 40. The spiral flight portions 46 for separating the groove portions 45 are provided between the groove portions 45. A plurality of groove portions 45 may be provided on the side surface portions of the screw 40. For example, two groove portions 45 may be provided on the side surface portions of the screw 40 in a double spiral shape.

Figure 3:
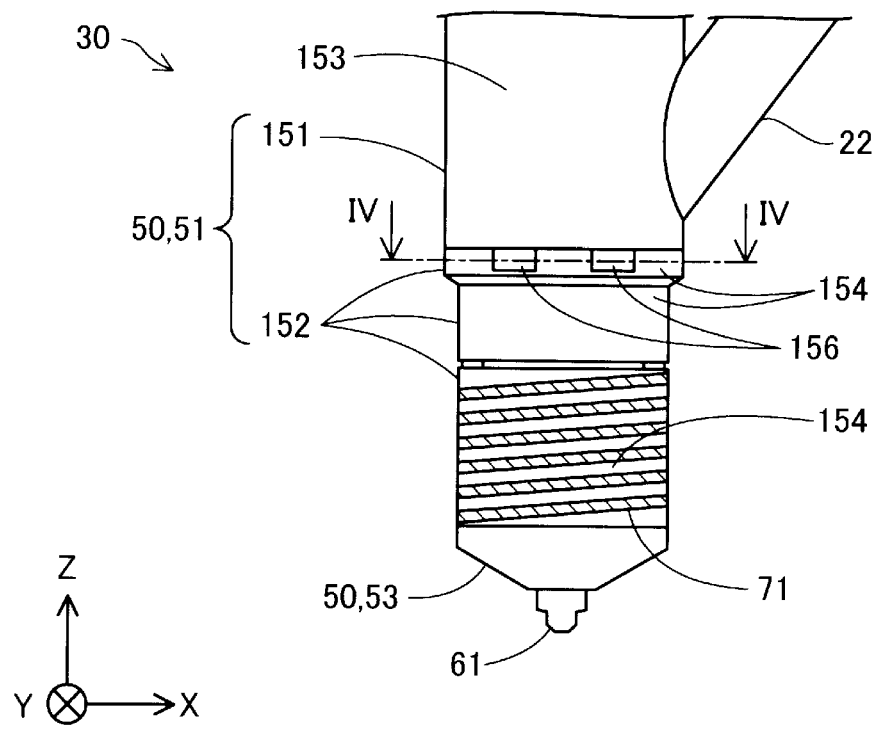
FIG. 3 is a diagram showing a configuration of a cylinder according to the first embodiment.

FIG. 3 is a diagram showing a configuration of the cylinder 50 according to the present embodiment. In the present embodiment, a gap portion 156 is provided between the supply port 54 of the cylinder 50 and a portion provided with the first heating unit 71. In the present embodiment, the gap portion 156 is provided at a bonding portion of the second portion 152 with the first portion 151 of the cylinder 50. In the present embodiment, a recess is formed in a part of the second outer peripheral portion 154 for providing the gap portion 156 in the second portion 152. The gap portion 156 is not limited to the above-described position, and may be provided in a part of the cylinder 50 between the supply port 54 and the first heating unit 71. For example, the gap portion 156 may not be provided in the second outer peripheral portion 154, and the gap portion 156 may be provided at a bonding portion in the first outer peripheral portion 153 with the second portion 152. The gap portion 156 may be provided in both the first portion 151 and the second portion 152. The gap portion 156 is sometimes referred to as a heat insulating portion.

Figure 4:
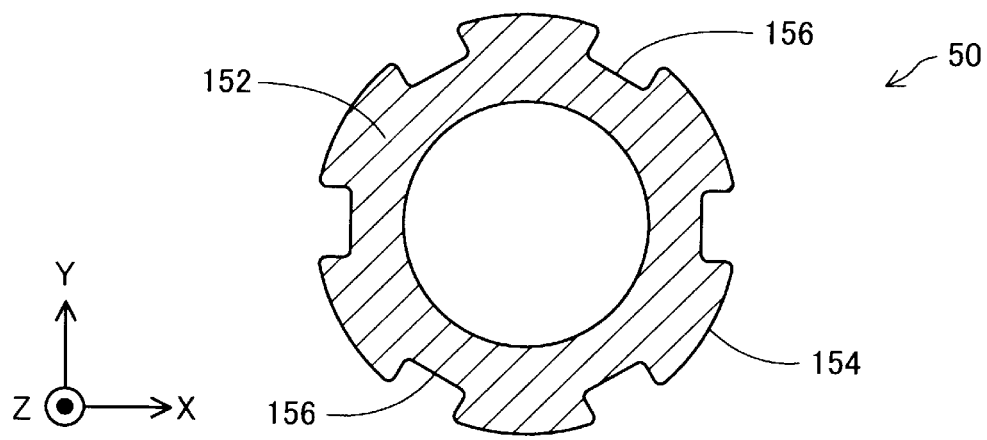
FIG. 4 is a sectional view taken along a line IV-IV of the cylinder according to the first embodiment.

FIG. 4 is a sectional view taken along a line IV-IV of the cylinder 50 in FIG. 3. In the present embodiment, as shown in FIG. 4, six gap portions 156 are disposed at equal intervals along an outer peripheral edge of the second portion 152. The number of the gap portions 156 is not limited to six, and may be one, or may be plural other than six. The gap portions 156 may be densely disposed in the vicinity of the supply port 54. That is, an interval between the gap portions 156 may be narrowed in the vicinity of the supply port 54.

Figure 5:
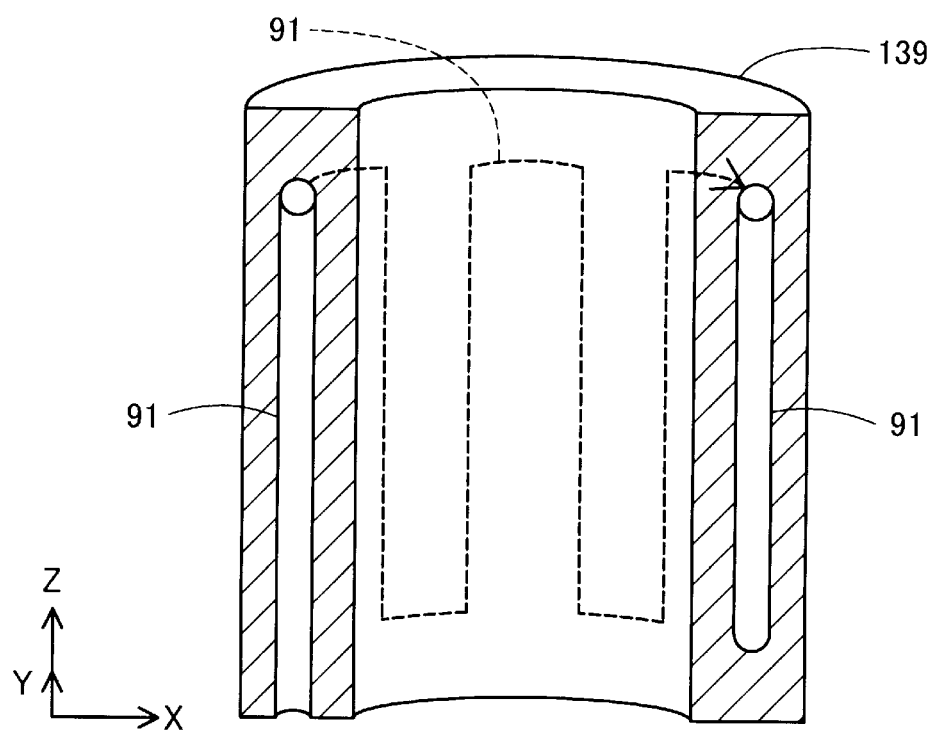
FIG. 5 is a diagram showing a configuration of a first refrigerant flow path according to the first embodiment.

FIG. 5 is a diagram showing a configuration of the first refrigerant flow path 91 according to the present embodiment. FIG. 5 shows a cross section of the motor case portion 139. In FIG. 5, a path of the first refrigerant flow path 91 provided inside the motor case portion 139 is shown by a broken line. In the present embodiment, one first refrigerant flow path 91 is three-dimensionally disposed in the motor case portion 139. The first refrigerant flow path is three-dimensionally disposed by coupling portions extending in the Z direction and portions extending along a circumferential direction of the cylindrical motor case portion 139. The first refrigerant flow path 91 is disposed evenly over an entire circumference of the motor case portion 139. The first refrigerant flow path 91 may branch inside the motor case portion 139. A plurality of first refrigerant flow paths 91 may be provided inside the motor case portion 139.

Figure 6:
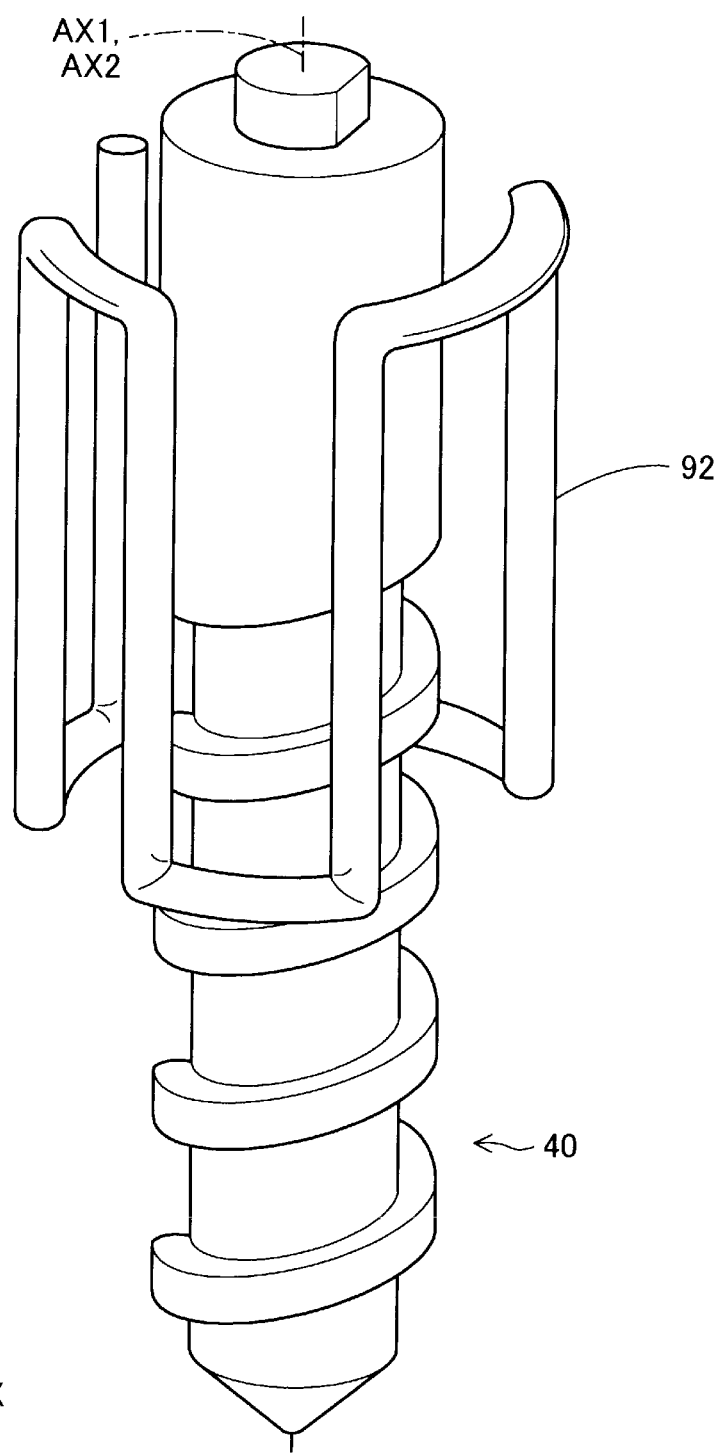
FIG. 6 is a diagram showing a configuration of a second refrigerant flow path according to the first embodiment.

FIG. 6 is a diagram showing a configuration of the second refrigerant flow path 92 according to the present embodiment. In FIG. 6, the screw 40 is shown together with the second refrigerant flow path 92. In FIG. 6, an illustration of an outer shape of the cylinder 50 is omitted, and an inner wall surface of the cylinder 50 where the second refrigerant flow path 92 is formed is shown. In the present embodiment, one second refrigerant flow path 92 is three-dimensionally disposed in the first portion 151 of the cylinder 50. The second refrigerant flow path 92 is three-dimensionally disposed by coupling portions extending in the Z direction and portions extending along a circumferential direction of a circle centered on the central axis AX1. The second refrigerant flow path 92 is disposed evenly over an entire circumference of the first portion 151. The second refrigerant flow path 92 may branch inside the first portion 151. A plurality of second refrigerant flow paths 92 may be provided inside the first portion 151.

Figure 7:
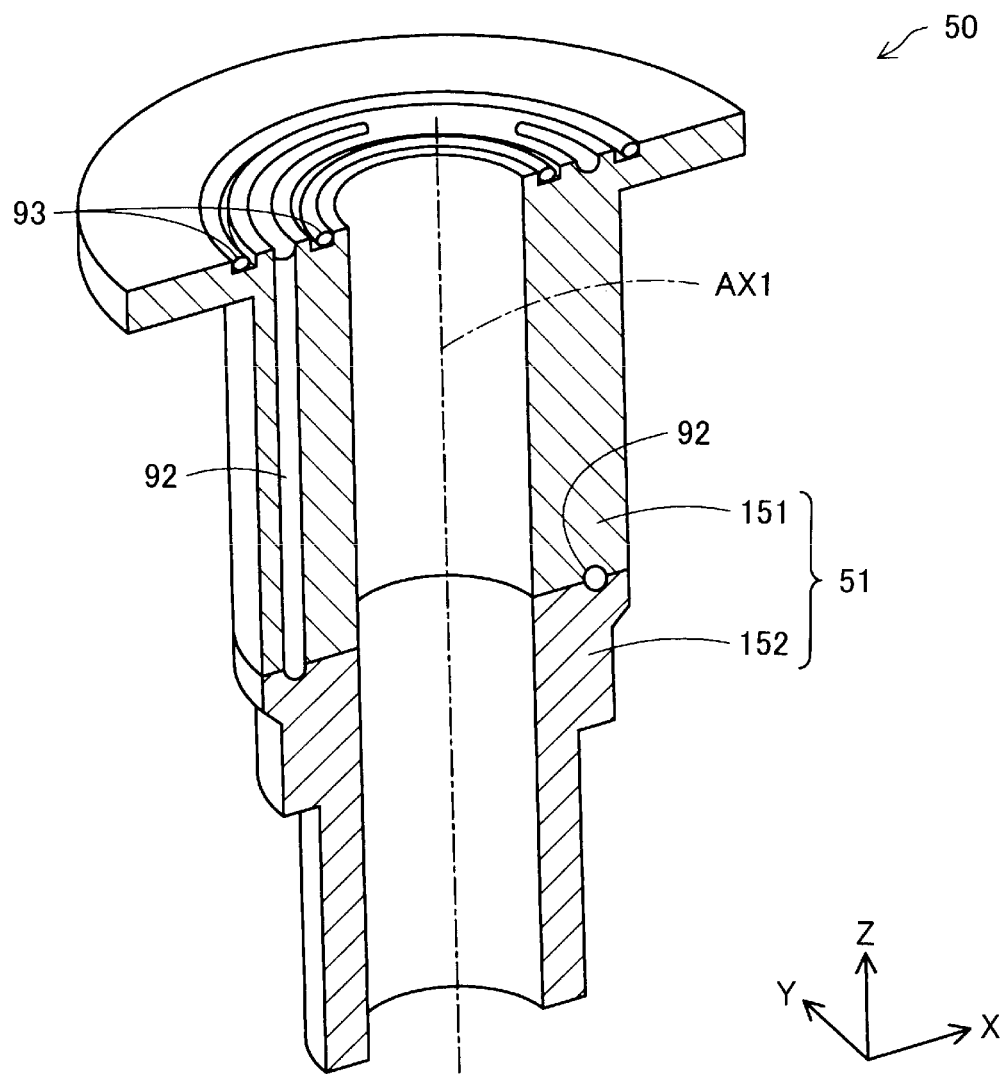
FIG. 7 is a diagram showing a configuration of a coupling portion between the cylinder and a case.

FIG. 7 is a diagram showing a coupling portion between the first portion 151 of the cylinder 50 and the case 39 of the screw drive unit 35. In FIG. 7, an illustration of the case 39 is omitted, and the cylinder 50 cut along a plane passing through the central axis AX1 is shown. In the present embodiment, a groove communicating with the second refrigerant flow path 92 is provided on an upper end surface of the first portion 151 of the cylinder 50. The groove provided on the upper end surface of the first portion 151 extends along the circumferential direction of the circle centered on the central axis AX1. A groove communicating with the first refrigerant flow path 91 is provided on a lower surface of the gear case portion 138 of the case 39 in a vertical direction opposite to the groove provided on the upper end surface of the first portion 151. By coupling the first portion 151 and the gear case portion 138, the groove provided in the first portion 151 and the groove provided in the gear case portion 138 are combined to couple the first refrigerant flow path 91 and the second refrigerant flow path 92. Grooves into which an O-ring 93 is fitted are provided on both sides of the groove provided in the first portion 151. The O-ring 93 is crushed by the first portion 151 and the gear case portion 138, and leakage of the refrigerant from between the first portion 151 and the gear case portion 138 is prevented.

In the present embodiment, a groove extending along the circumferential direction of the circle centered on the central axis AX1 is provided on a lower end surface of the first portion 151. A groove is provided on an upper end surface of the second portion 152 in a vertical direction opposite to the groove provided on the lower end surface of the first portion 151. By coupling the first portion 151 and the second portion 152, the groove provided on the lower end surface of the first portion 151 and the groove provided on the upper end surface of the second portion 152 are combined to form a portion of the second refrigerant flow path 92. A through hole extending linearly along the central axis AX1 is provided inside the first portion 151. The through hole communicates with the groove provided on the upper end surface of the first portion 151 and the groove provided on the lower end surface of the first portion 151. A part of the second refrigerant flow path 92 is formed by the through hole. In the present embodiment, since the second refrigerant flow path 92 is formed by the groove or the through hole provided in the first portion 151, the second refrigerant flow path 92 can be formed in the three-dimensional path shown in FIG. 6 without using a three-dimensional shaping technique.

Figure 8:
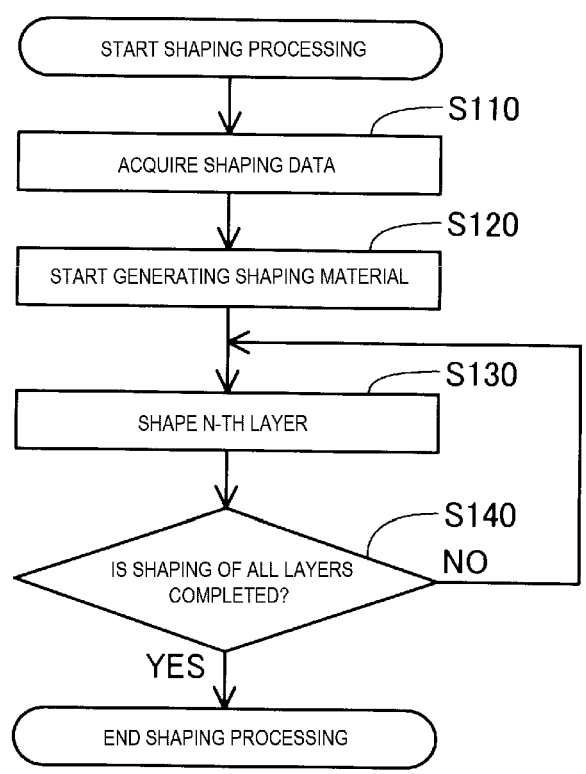
FIG. 8 is a flowchart showing contents of a shaping processing according to the first embodiment.

FIG. 8 is a flowchart showing contents of a shaping processing according to the present embodiment. When a predetermined start operation is performed by a user on an operation panel provided in the three-dimensional shaping device 100 or a computer coupled to the three-dimensional shaping device 100, the shaping processing is executed by the control unit 500.

First, in step S110, the control unit 500 acquires shaping data for shaping a three-dimensional shaped object OB. The shaping data represents information about a movement path of the nozzle hole 69 with respect to the stage 300, an amount of the shaping material discharged from the nozzle hole 69, a target rotation speed of the drive motor 36 for rotating the screw 40, a target temperature of a heater in the first heating unit 71, or the like. The shaping data is generated by, for example, slicer software installed in the computer coupled to the three-dimensional shaping device 100. The slicer software reads shape data showing a shape of the three-dimensional shaped object OB created using three-dimensional CAD software or three-dimensional CG software, and divides the shape of the three-dimensional shaped object OB into layers with a predetermined thickness, so as to generate the shaping data. Data in an STL format or an AMF format can be used for the shape data read into the slicer software. The shaping data created by the slicer software is shown with a G code, an M code, or the like. The control unit 500 acquires the shaping data from the computer coupled to the three-dimensional shaping device 100 or a recording medium such as a USB memory.

Next, in step S120, the control unit 500 starts generating the shaping material. The control unit 500 controls the rotation of the screw 40 and the temperature of the heater in the first heating unit 71 to melt the material so as to generate the shaping material. When the generation of the shaping material is started, the control unit 500 drives the refrigerant supply unit 96 to start the supply of the refrigerant to the first refrigerant flow path 91 and the second refrigerant flow path 92. By the rotation of the screw 40, the material supplied from the supply port 54 into the cylinder 50 is introduced into the groove portion 45 of the screw 40. The material introduced into the groove portion 45 is conveyed along the groove portion 45 from the supply port 54 toward the through hole 56. While the material is being conveyed along the groove portion 45, at least a part of the material is melted by a relative rotation between the screw 40 and the cylinder 50 and the heating of the first heating unit 71 to become a paste-shaped shaping material having fluidity. The higher the temperature of the first heating unit 71, the more easily the material is melted. The larger a rotation speed of the screw 40, the more easily the material is melted. The larger the rotation speed of the screw 40, the more easily the material is to be conveyed toward the nozzle 61. The shaping material collected in a vicinity of the tip end portion 43 of the screw 40 is supplied to the nozzle 61 via the through hole 56 by an internal pressure. The shaping material continues to be generated while the processing is performed.

Figure 9:
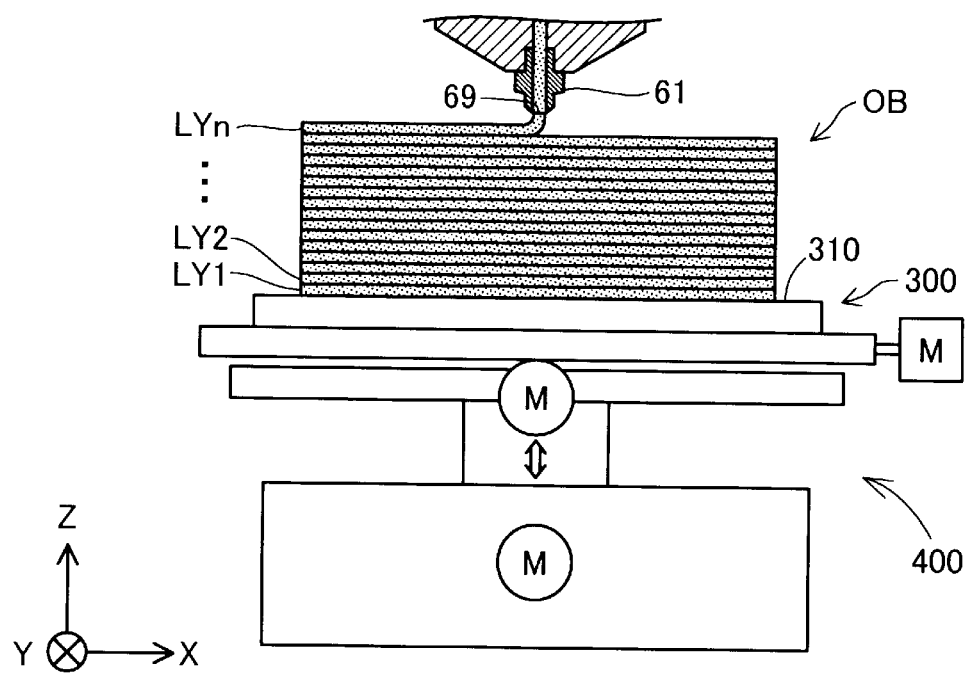
FIG. 9 is a diagram schematically showing a state where a three-dimensional shaped object is shaped.

FIG. 9 is a diagram schematically showing a state where the three-dimensional shaped object OB is shaped. Referring to FIGS. 8 and 9, and in step S130, the control unit 500 shapes a first layer LY1 of the three-dimensional shaped object OB according to the shaping data. The nozzle fixing portion 53 may be provided with a pressure sensor for measuring a pressure of the shaping material inside the through hole 56. In step S130, the control unit 500 may adjust the rotation speed of the screw 40 by controlling the drive motor 36 according to a value of the pressure measured by the pressure sensor. The nozzle fixing portion 53 may be provided with a flow rate sensor for measuring a flow rate of the shaping material inside the through hole 56. In step S130, the control unit 500 may adjust the rotation speed of the screw 40 by controlling the drive motor 36 according to a value of the flow rate measured by the flow rate sensor.

After the formation of the first layer LY1 is completed, in step S140, the control unit 500 determines whether the shaping of all layers of the three-dimensional shaped object OB is completed. The control unit 500 can determine, using the shaping data, whether the shaping of all layers of the three-dimensional shaped object OB is completed. When it is determined in step S140 that the shaping of all layers of the three-dimensional shaped object OB is completed, the control unit 500 ends the processing. On the other hand, when it is determined in step S140 that the shaping of all layers of the three-dimensional shaped object OB is not completed, the control unit 500 returns the processing to step S130 to shape a second layer LY2 of the three-dimensional shaped object OB. The control unit 500 repeats the processing from step S130 to step S140 until it is determined in step S140 that the shaping of all layers of the three-dimensional shaped object OB is completed, so as to shape the three-dimensional shaped object OB in which a plurality of layers are stacked. After the shaping processing, a cutting process may be applied to the three-dimensional shaped object OB.

According to the three-dimensional shaping device 100 of the present embodiment described above, since the first refrigerant flow path 91 provided in the case 39 of the screw drive unit 35 is provided in a path passing through the motor case portion 139 configured to accommodate the drive motor 36, it is possible to prevent the temperature of the drive motor 36 from becoming too high by flowing the refrigerant to the first refrigerant flow path 91. Therefore, since the screw 40 can be easily rotated at a desired rotation speed, a desired amount of the shaping material can be easily discharged from the nozzle hole 69.

In the present embodiment, the first portion 151 having the supply port 54 can be cooled by flowing the refrigerant to the second refrigerant flow path 92 provided inside the first portion 151 of the cylinder 50. Therefore, since it is possible to prevent material conveyance due to the rotation of the screw 40 from becoming difficult due to the material being melted in the vicinity of the supply port 54, it is possible to prevent an insufficiency of the amount of the shaping material discharged from the nozzle hole 69.

In the present embodiment, since the first refrigerant flow path 91 provided inside the case 39 of the screw drive unit 35 and the second refrigerant flow path 92 provided inside the first portion 151 of the cylinder 50 communicate with each other, the refrigerant can be supplied to both the first refrigerant flow path 91 and the second refrigerant flow path 92 by the refrigerant supply unit 96. Therefore, a size of the three-dimensional shaping device 100 can be reduced as compared with a form in which a device that supplies the refrigerant to the first refrigerant flow path 91 and a device that supplies the refrigerant to the second refrigerant flow path 92 are separately provided.

In the present embodiment, since the refrigerant cooled by the refrigerant supply unit 96 flows from the second refrigerant flow path 92 to the first refrigerant flow path 91, a temperature of a refrigerant flowing through the second refrigerant flow path 92 can be lower than a temperature of a refrigerant flowing through the first refrigerant flow path 91. Therefore, the first portion 151 having the supply port 54 can be effectively cooled.

In the present embodiment, since the gap portion 156 is provided between the first portion 151 having the supply port 54 and the second portion 152 provided with the first heating unit 71, heat from the first heating unit 71 can be prevented from being transferred from the second portion 152 to the vicinity of the supply port 54 in the first portion 151.

In the present embodiment, a pellet-shaped ABS resin is used as the material, whereas as a material used in the shaping unit 200, for example, a material for shaping a three-dimensional shaped object using various materials such as a material having thermoplasticity, a metal material, and a ceramic material as a main material can also be used. Here, the "main material" means a central material for forming a shape of the three-dimensional shaped object, and a material occupying a content of 50% by weight or more in the three-dimensional shaped object. The above shaping materials include those in which main materials are melted alone, and those in which some of the contained components are melted together with the main material to form a paste.

When the material having thermoplasticity is used as the main material, a shaping material is generated by plasticizing the material in the plasticization unit 30. The term "plasticize" means that the material having thermoplasticity is heated and melted. The term "melt" not only means that the material having thermoplasticity is heated to a temperature equal to or higher than a melting point to become a liquid, but also means that the material having thermoplasticity is softened by being heated to a temperature equal to or higher than a glass transition point to exhibit fluidity.

As the material having thermoplasticity, for example, a thermoplastic resin material obtained by combining one or more of the following can be used.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyetheretherketone (PEEK)

The material having thermoplasticity may contain an additive such as a pigment, a metal, a ceramic, a wax, a flame retardant, an antioxidant, and a heat stabilizer. The material having thermoplasticity is plasticized by the rotation of the screw 40 and the heating of the first heating unit 71 and is then converted into a melted state in the plasticization unit 30. After the shaping material thus generated is discharged from the nozzle hole 69, the shaping material is cured due to a reduction in temperature.

It is desirable that the material having thermoplasticity is discharged from the nozzle holes 69 in a state where the material is heated to a temperature equal to or higher than the glass transition point thereof and is in a completely melted state. The term "completely melted state" means a state where a non-melted material having thermoplasticity does not exist, and means a state where, for example, when a pellet-shaped thermoplastic resin is used as the material, a pellet-shaped solid does not remain.

In the shaping unit 200, for example, the following metal material may be used as a main material instead of the above material having thermoplasticity. In this case, it is desirable that a component to be melted at the time of generating the shaping material is mixed with a powder material obtained by converting the following metal material into powder, and then the mixture is charged into the plasticization unit 30.
Example of Metal Material A single metal of magnesium (Mg), iron (Fe), cobalt (Co) or chromium (Cr), aluminum (Al), titanium (Ti), copper (Cu), and nickel (Ni), or an alloy containing one or more of these metals
Example of Alloy Maraging steel, steel, stainless steel, cobalt chrome molybdenum, titanium alloy, nickel alloy, aluminum alloy, cobalt alloy, and cobalt chromium alloy In the shaping unit 200, a ceramic material can be used as a main material instead of the above metal material. As the ceramic material, for example, oxide ceramics such as silicon dioxide, titanium dioxide, aluminum oxide, and zirconium oxide, and non-oxide ceramics such as aluminum nitride can be used. When the above metal material or ceramic material is used as the main material, the shaping material disposed on the stage 300 may be cured by, for example, sintering with laser irradiation or warm air.

The powder material of the metal material or the ceramic material charged into the material supply unit 20 may be a mixed material obtained by mixing a plurality of types of powder including single metal powder, alloy powder, and ceramic material powder. The powder material of the metal material or the ceramic material may be coated with, for example, the thermoplastic resin shown above or another thermoplastic resin. In this case, the thermoplastic resin may be melted in the plasticization unit 30 to exhibit fluidity.

For example, the following solvents can be added to the powder material of the metal material or the ceramic material charged into the material supply unit 20. The solvent can be used alone or in combination of two or more selected from the following.
Example of Solvent Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged into the material supply unit 20.
Example of Binder Acrylic resin, epoxy resin, silicone resin, cellulose resin or other synthetic resins, or polylactic acid (PLA), polyamide (PA), polyphenylene sulfide (PPS), polyetheretherketone (PEEK) or other thermoplastic resins

B. Second Embodiment

Figure 10:
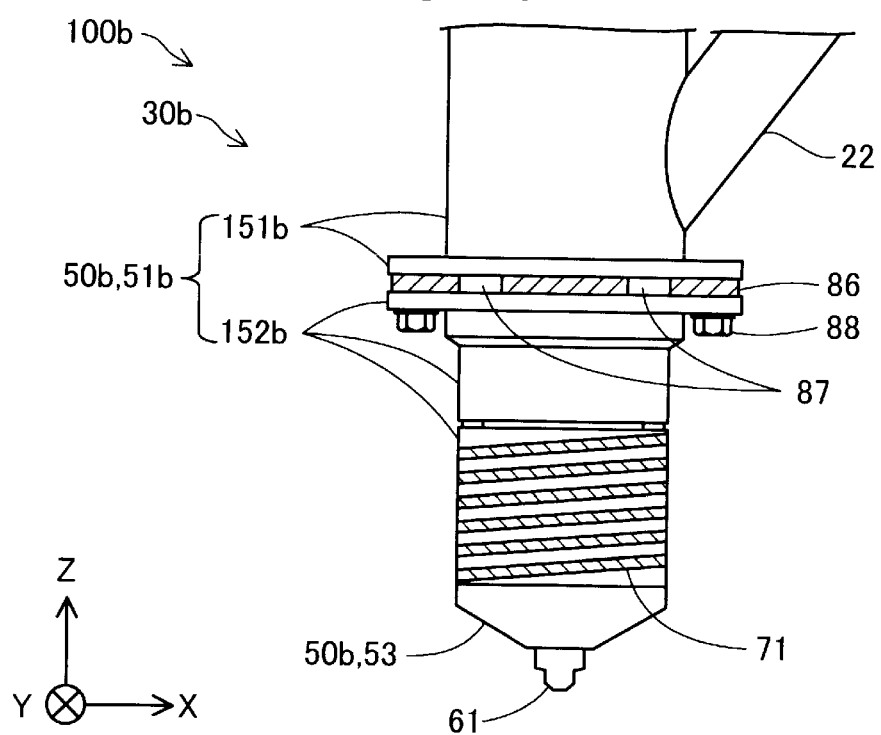
FIG. 10 is a diagram showing a configuration of a cylinder according to a second embodiment.

FIG. 10 is a diagram showing a configuration of a cylinder 50b according to a second embodiment. In a three-dimensional shaping device 100b of the second embodiment, a configuration of the cylinder 50b of a plasticization unit 30b is different from that of the first embodiment. Other configurations are the same as those of the first embodiment shown in FIG. 1 unless otherwise specified.

In the present embodiment, a main body portion 51b of the cylinder 50b includes a first portion 151b and a second portion 152b formed separately. A lower end of the first portion 151b and an upper end of the second portion 152b are each formed in a flange shape. The lower end of the first portion 151b and the upper end of the second portion 152b are coupled by bolts 88 via a heat insulating portion 86. The heat insulating portion 86 has a hollow disc shape. A heat conductivity of the heat insulating portion 86 is lower than a heat conductivity of the first portion 151 and lower than a heat conductivity of the second portion 152. The heat insulating portion 86 can be formed of, for example, zirconia. A heat insulating coating may be applied to the bolt 88.

In the present embodiment, the gap portion 156 is not provided in the second portion 152b, and gap portions 87 are provided in the heat insulating portion 86. A portion of an outer peripheral portion of the heat insulating portion 86 is cut out for providing the gap portion 87 in the heat insulating portion 86. The gap portions 87 in the present embodiment are disposed at equal intervals along an outer peripheral edge of the heat insulating portion 86 in the same manner as the gap portion 156 of the first embodiment shown in FIG. 4. The gap portion 87 provided in the heat insulating portion 86 is not limited to the above form, and a through hole or a groove may be formed in the heat insulating portion 86 for providing the gap portion 87 in the heat insulating portion 86.

According to the three-dimensional shaping device 100b of the present embodiment described above, since the first portion 151b having the supply port 54 and the second portion 152b provided with the first heating unit 71 are coupled via the heat insulating portion 86, the heat from the first heating unit 71 can be prevented from being transferred from the second portion 152b to the first portion 151b. In particular, in the present embodiment, since the gap portion 87 is provided in the heat insulating portion 86, it is possible to effectively prevent the heat of the first heating unit 71 from being transferred from the second portion 152b to the first portion 151b.

C. Third Embodiment

Figure 11:
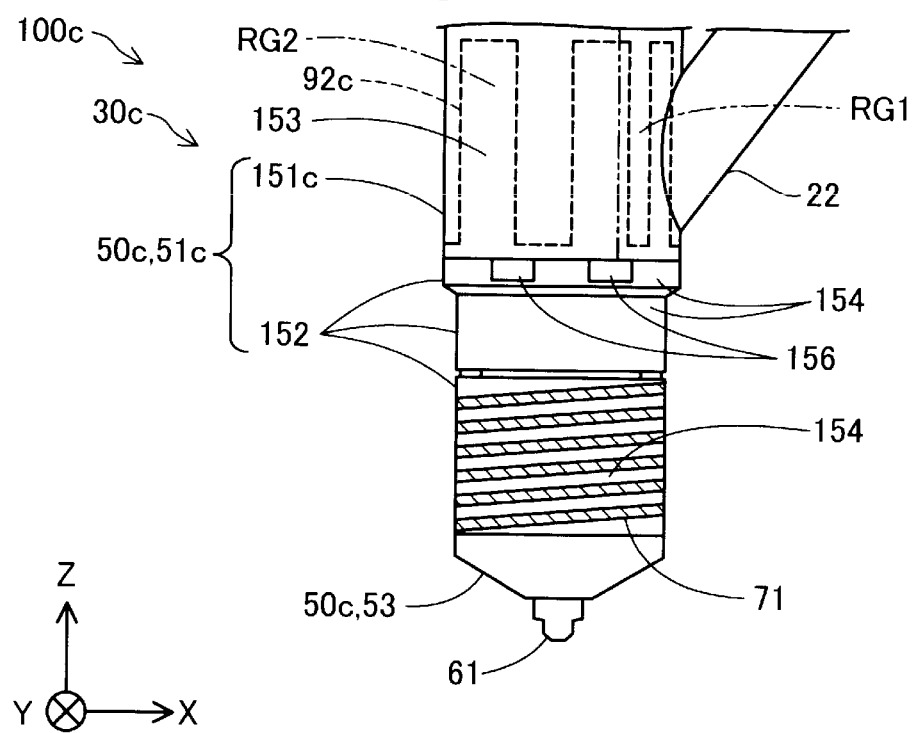
FIG. 11 is a diagram showing a configuration of a cylinder according to a third embodiment.

FIG. 11 is a diagram showing a configuration of a cylinder 50c according to a third embodiment. In FIG. 11, paths of a second refrigerant flow path 92c are shown by a broken line, and a boundary between a first region RG1 and a second region RG2, which are to be described later, is shown by a two-dot chain line. In a three-dimensional shaping device 100c according to the third embodiment, a configuration of the cylinder 50c of a plasticization unit 30c is different from that of the first embodiment. More specifically, the configuration of the second refrigerant flow path 92c provided inside a first portion 151c of the cylinder 50c is different from that of the first embodiment. Other configurations are the same as those of the first embodiment shown in FIG. 1 unless otherwise specified.

In the present embodiment, the first portion 151c of the cylinder 50c has the first region RG1 and the second region RG2. The first region RG1 is a region in the vicinity of the supply port 54. The second region RG2 is a region different from the first region RG1. A distance between the first region RG1 and the supply port 54 is shorter than a distance between the second region RG2 and the supply port 54. The second refrigerant flow path 92c is disposed more densely in the first region RG1 than in the second region RG2. The expression "the second refrigerant flow path 92c is densely disposed" means an interval between paths of the second refrigerant flow path 92c is narrow. In the present embodiment, the second refrigerant flow path 92c may be densely disposed in both the first region RG1 and a third region RG3 shown in FIG. 12 to be described later. In this case, the region excluding the first region RG1 and the third region RG3 is the second region RG2.

According to the three-dimensional shaping device 100c of the present embodiment described above, since the second refrigerant flow path 92c is disposed more densely in the first region RG1, which is close to the supply port 54, than in the second region RG2, which is far from the supply port 54, the vicinity of the supply port 54 in the first portion 151c can be effectively cooled. An opening portion for supplying the refrigerant to the second refrigerant flow path 92c may be provided in the first region RG1. In this case, the vicinity of the supply port 54 can be cooled more effectively. The second refrigerant flow path 92c described in the present embodiment may be provided inside the first portion 151b of the cylinder 50b described in the second embodiment.

D. Fourth Embodiment

Figure 12:
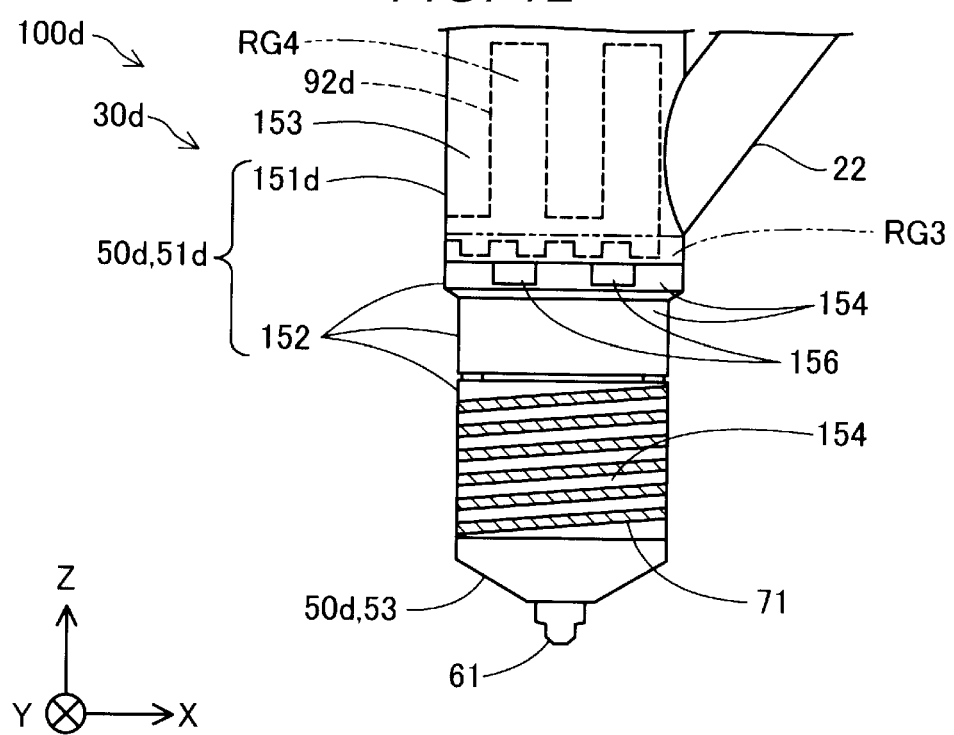
FIG. 12 is a diagram showing a configuration of a cylinder according to a fourth embodiment.

FIG. 12 is a diagram showing a configuration of a cylinder 50d according to a fourth embodiment. In FIG. 12, a path of a second refrigerant flow path 92d is shown by a broken line, and a boundary between the third region RG3 and a fourth region RG4, which are to be described later, is shown by a two-dot chain line. In a three-dimensional shaping device 100d according to the fourth embodiment, a configuration of the cylinder 50d of a plasticization unit 30d is different from that of the first embodiment. More specifically, a configuration of the second refrigerant flow path 92d provided inside a first portion 151d of the cylinder 50d is different from that of the first embodiment. Other configurations are the same as those of the first embodiment shown in FIG. 1 unless otherwise specified.

In the present embodiment, the first portion 151d of the cylinder 50d has the third region RG3 and the fourth region RG4. The third region RG3 is a region in a vicinity of a coupling portion between the first portion 151d and the second portion 152. The fourth region RG4 is a region different from the third region RG3. A distance between the third region RG3 and the second portion 152 is shorter than a distance between the fourth region RG4 and the second portion 152. The second refrigerant flow path 92d is disposed more densely in the third region RG3 than in the fourth region RG4. In the present embodiment, the second refrigerant flow path 92d may be densely disposed in both the third region RG3 and the first region RG1 shown in FIG. 11. In this case, the region excluding the first region RG1 and the third region RG3 is the fourth region RG4.

According to the three-dimensional shaping device 100d of the present embodiment described above, since the second refrigerant flow path 92d is disposed more densely in the third region RG3, which is close to the second portion 152, than in the fourth region RG4, which is far from the second portion, a vicinity of the second portion 152 in the first portion 151d can be effectively cooled. Therefore, the heat from the first heating unit 71 can be prevented from being transferred to the first portion 151d via the second portion 152. The second refrigerant flow path 92d described in the present embodiment may be provided inside the first portion 151b of the cylinder 50b described in the second embodiment.

E. Fifth Embodiment

Figure 13:
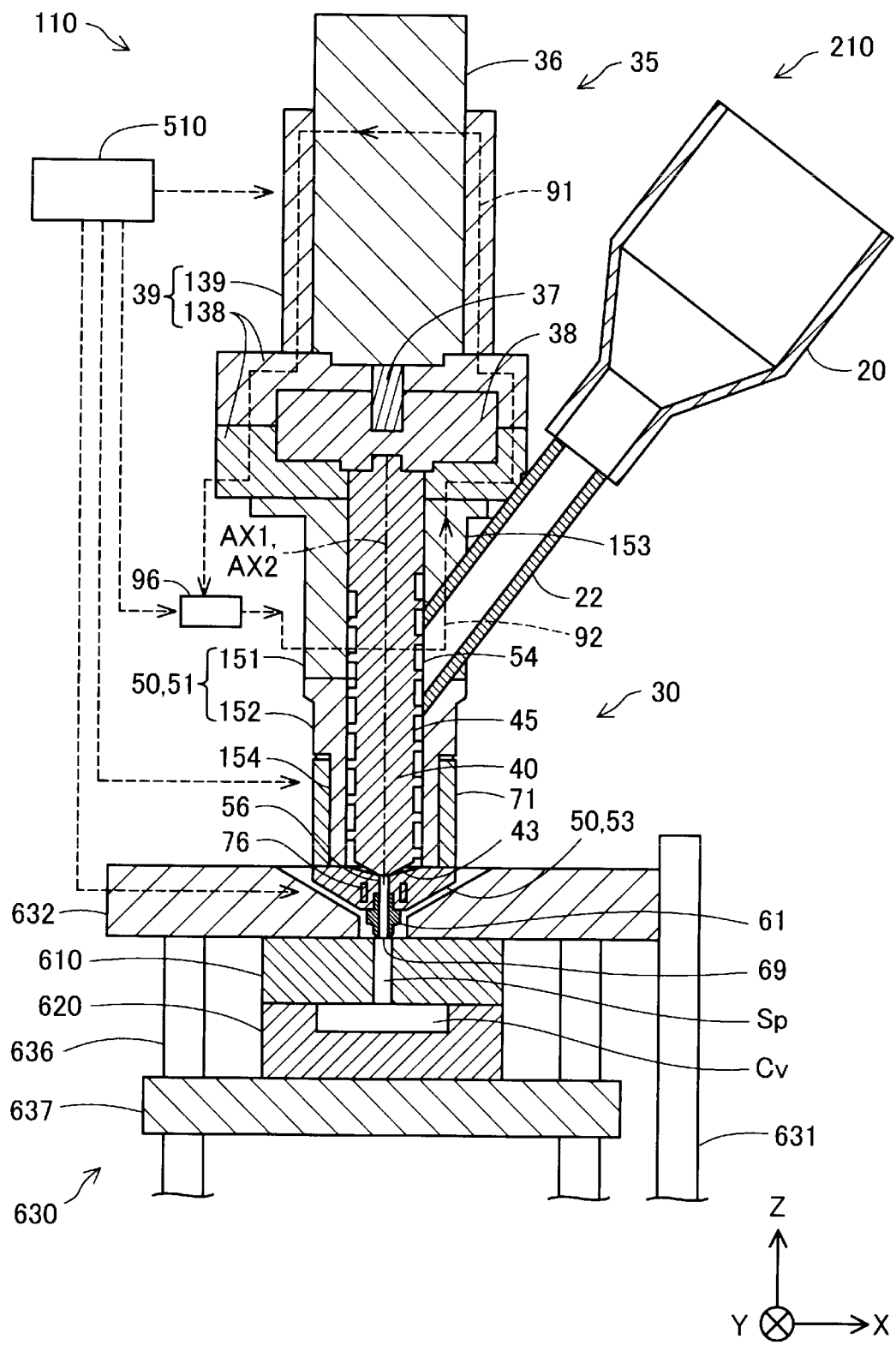
FIG. 13 is a diagram showing a schematic configuration of an injection molding device according to a fifth embodiment.

FIG. 13 is a diagram showing a schematic configuration of an injection molding device 110 according to a fifth embodiment. The injection molding device 110 according to the present embodiment includes an injection unit 210, a fixed mold 610, a movable mold 620, a mold clamping device 630, and a control unit 510.

The injection unit 210 includes the material supply unit 20 and the plasticization unit 30 having the same configuration as the first embodiment. Other configurations of the injection unit 210 are the same as those of the first embodiment shown in FIG. 1 unless otherwise specified. The injection unit 210 plasticizes the material supplied from the material supply unit 20 by the plasticization unit 30 to melt the material into a molten material, so as to inject the molten material from the nozzle hole 69 provided at the tip end portion of the nozzle 61. The injection unit 210 is driven under the control of the control unit 510. The injection unit 210 includes an injection cylinder, a plunger accommodated in the injection cylinder, and a plunger drive unit configured to translate the plunger inside the injection cylinder, and the through hole 56 of the cylinder 50 may be coupled to the injection cylinder via a check valve, and the nozzle 61 may be coupled to the injection cylinder.

The fixed mold 610 is fixed to the mold clamping device 630. The fixed mold 610 has a sprue Sp through which the molten material injected from the nozzle hole 69 flows. The movable mold 620 is moved by the mold clamping device 630. When the movable mold 620 comes into contact with the fixed mold 610, a cavity Cv, which is a space corresponding to a shape of a shaped article, is formed between the movable mold 620 and the fixed mold 610. The molten material injected from the nozzle hole 69 is filled in the cavity Cv via the sprue Sp.

The mold clamping device 630 performs mold closing, mold clamping, and mold opening by moving the movable mold 620 with respect to the fixed mold 610. The mold clamping device 630 includes a frame 631, a fixed platen 632, a diver 636, and a movable platen 637. The fixed mold 610 is fixed to the fixed platen 632. The fixed platen 632 is fixed to the frame 631. The movable mold 620 is fixed to the movable platen 637. The movable platen 637 is moved along the diver 636 by an actuator (not shown). The actuator is driven under the control of the control unit 510. The actuator is implemented by, for example, a hydraulic cylinder.

As described above, since the above injection molding device 110 of the present embodiment includes the plasticization unit 30 having the same configuration as that of the first embodiment, it is possible to prevent the temperature of the drive motor 36 from becoming too high. The injection molding device 110 may include the plasticization units 30b to 30d described in the second to fourth embodiments instead of the plasticization unit 30 described above.

Figure 14:
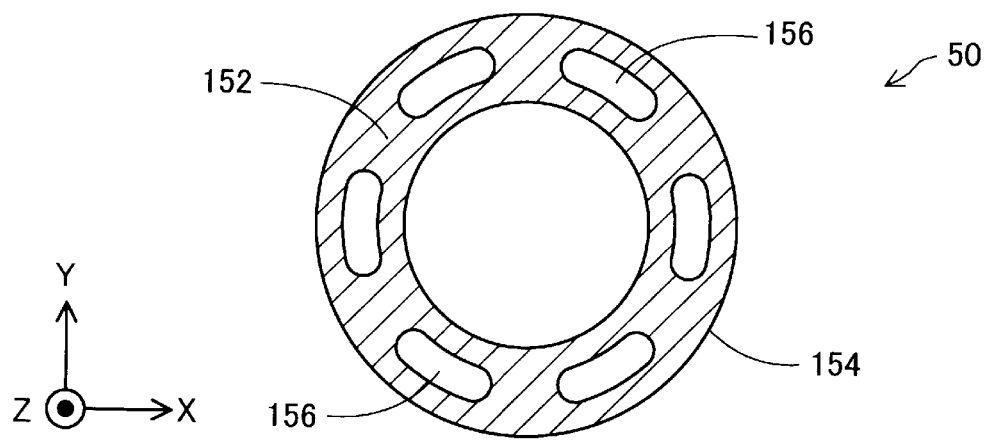
FIG. 14 is a diagram showing a configuration of a gap portion according to another embodiment.

F. Other Embodiments (F1) FIG. 14 is a diagram showing a configuration of the gap portion 156 according to another embodiment. FIG. 14 shows a cross section of the cylinder 50 perpendicular to the central axis AX1. The hollow gap portion 156 that does not communicate with the outside of the cylinder 50 may be provided inside the cylinder 50 between the supply port 54 and the first heating unit 71. For example, by forming the groove on the upper end surface of the second portion 152 and forming the groove on the lower end surface of the first portion 151 in the vertical direction opposite to above groove so as to integrate the first portion 151 and the second portion 152 using a metal bonding technique such as diffusion bonding, the hollow gap portion 156 that does not communicate with the outside of the cylinder 50 can be provided inside the cylinder 50.

(F2) In the three-dimensional shaping devices 100 to 100d and the injection molding device 110 of the embodiments described above, the second refrigerant flow path 92 (to 92d) is provided inside the first portion 151 (to 151d) of the cylinder 50 (to 50d). In contrast, the second refrigerant flow path 92 (to 92d) may not be provided inside the first portions 151 (to 151d).

(F3) In the three-dimensional shaping devices 100 to 100d and the injection molding device 110 of the embodiments described above, the first refrigerant flow path 91 provided inside the case 39 communicates with the second refrigerant flow path 92 (to 92d) provided in the first portion 151 (to 151d) of the cylinder 50 (to 50d). In contrast, the first refrigerant flow path 91 may not communicate with the second refrigerant flow path 92 (to 92d). Even in this case, for example, it is possible to separately supply the refrigerant to the first refrigerant flow path 91 and the second refrigerant flow path 92 (to 92d) by providing two refrigerant supply units 96.

(F4) In the three-dimensional shaping devices 100 to 100d and the injection molding device 110 of the embodiments described above, the refrigerant flows from the second refrigerant flow path 92 (to 92d) to the first refrigerant flow path 91. In contrast, the refrigerant may flow from the first refrigerant flow path 91 to the second refrigerant flow path (to 92d). In this case, since the temperature of the refrigerant flowing through the first refrigerant flow path 91 can be lower than the temperature of the refrigerant flowing through the second refrigerant flow path 92 (to 92d), the screw drive unit 35 including the drive motor 36 can be effectively cooled.

(F5) In the three-dimensional shaping devices 100 to 100d and the injection molding device 110 of the embodiments described above, the second heating unit 76 is provided in the nozzle fixing portion 53. In contrast, the second heating unit 76 may not be provided in the nozzle fixing portion 53.

(F6) In the three-dimensional shaping device 100 of the first embodiment, the three-dimensional shaping devices 100c and 100d of the third and fourth embodiments, and the injection molding device 110 of the fifth embodiment described above, the gap portion 156 is provided in a part of the cylinder 50 (50c, 50d) between the supply port 54 and the first heating unit 71. In contrast, the gap portion 156 may not be provided in the cylinder 50 (50c, 50d).

(F7) In the three-dimensional shaping device 100b of the second embodiment described above, the gap portion 87 is provided in the heat insulating portion 86. In contrast, the gap portion 87 may not be provided in the heat insulating portion 86.

(F8) In the three-dimensional shaping device 100b of the second embodiment described above, in addition to the gap portion 87 provided in the heat insulating portion 86, the gap portion 156 may be provided in a part of the cylinder 50b between the supply port 54 and the first heating unit 71.

(F9) In the three-dimensional shaping devices 100 to 100d and the injection molding device 110 of the embodiments described above, the first portion 151 (to 151d) and the second portion 152 (152b) of the cylinder 50 (to 50d) each have a cylindrical shape, and in the cross section perpendicular to the central axis AX1, the shape of the outer contour line of the first portion 151 (to 151d) and the shape of the inner contour line of the first portion 151 (to 151d) are circles, and the shape of the outer contour line of the second portion 152 (152b) and the shape of the inner contour line of the second portion 152 (152b) are circles. In contrast, in the cross section perpendicular to the central axis AX1, at least one of the shape of the outer contour line of the first portion 151 (to 151d) and the shape of the outer contour line of the second portion 152 (152b) may not be a circle. For example, in the cross section perpendicular to the central axis AX1, at least one of the shape of the outer contour line of the first portion 151 (to 151d) and the shape of the outer contour line of the second portion 152 (152b) may be a polygon such as a quadrangle or a hexagon.

G. Other Aspects

The present disclosure is not limited to the above-described embodiments, and can be implemented in various aspects without departing from the spirit of the present disclosure. For example, the present disclosure can be implemented by the following aspects. In order to solve some or all of the problems described in the present disclosure, or to achieve some or all of the effects of the present disclosure, technical characteristics in the above embodiments corresponding to the technical characteristics in each of the embodiments described below can be appropriately replaced or combined. If the technical characteristics are not described as essential in the present description, they can be deleted as appropriate.

(1) According to one aspect of the present disclosure, a plasticization device is provided. The plasticization device includes: a cylinder having a supply port through which a material is supplied; a spiral screw configured to rotate inside the cylinder; a nozzle configured to discharge the material plasticized inside the cylinder; a heating unit provided between the supply port in the cylinder and the nozzle; a screw drive unit including a motor configured to rotate the screw; and a case configured to accommodate at least a part of the screw drive unit and having a first refrigerant flow path.

According to the plasticization device of this aspect, since the first refrigerant flow path is provided in the case configured to accommodate the screw drive unit including the motor, it is possible to prevent a temperature of the motor from becoming too high. Therefore, since the screw can be easily rotated at a desired rotation speed, a desired amount of a shaping material can be easily discharged from the nozzle.

(2) In the plasticization device of the above aspect, the cylinder may include a first portion having the supply port and a second portion provided with the heating unit, and the first portion may have a second refrigerant flow path.

According to the plasticization device of this aspect, since the first portion having the supply port can be cooled by flowing a refrigerant to the second refrigerant flow path, it is possible to prevent material conveyance due to rotation of the screw from becoming difficult due to the material being melted in a vicinity of the supply port. Therefore, it is possible to prevent an insufficiency of the amount of the material discharged from a tip end of the nozzle.

(3) In the plasticization device of the above aspect, the second refrigerant flow path may communicate with the first refrigerant flow path.

According to the plasticization device of this aspect, since it is possible to supply the refrigerant to both the first refrigerant flow path and the second refrigerant flow path without separately providing a device that supplies the refrigerant to the first refrigerant flow path and the device that supplies the refrigerant to the second refrigerant flow path, a size of the device can be reduced.

(4) In the plasticization device of the above aspect, a refrigerant may flow from the second refrigerant flow path to the first refrigerant flow path.

According to the plasticization device of this aspect, since a temperature of the refrigerant flowing through the second refrigerant flow path can be lower than a temperature of the refrigerant flowing through the first refrigerant flow path, the first portion having the supply port can be effectively cooled.

(5) In the plasticization device of the above aspect, the first portion may have a first region and a second region having a distance from the supply port longer than a distance between the first region and the supply port, and the second refrigerant flow path may be disposed more densely in the first region than in the second region.

According to the plasticization device of this aspect, since the second refrigerant flow path is disposed more densely in the first region, which is close to the supply port, than in the second region, which is far from the supply port, the vicinity of the supply port can be effectively cooled.

(6) In the plasticization device of the above aspect, the first portion may have a third region and a fourth region having a distance from the second portion longer than a distance between the third region and the second portion, and the second refrigerant flow path may be disposed more densely in the third region than in the fourth region.

According to the plasticization device of this aspect, since the second refrigerant flow path is disposed more densely in the third region, which is close to the second portion, than in the fourth region, which is far from the second portion, the vicinity of the second portion in the first portion can be effectively cooled. Therefore, heat from the heating unit can be prevented from being transferred to the first portion via the second portion.

(7) In the plasticization device of the above aspect, the cylinder may have a heat insulating portion between the supply port and the heating unit.

According to the plasticization device of this aspect, since the heat insulating portion is provided between a portion having the supply port in the cylinder and a portion provided with the heating unit, the heat from the first heating unit can be prevented from being transferred to the vicinity of the supply port.

The present disclosure may be implemented in various aspects other than the plasticization device. For example, the present disclosure can be implemented in the form of a three-dimensional shaping device, an injection molding device, or an extrusion molding device.

What is claimed is:

1. A plasticization device comprising:
   a cylinder having a supply port through which a material is supplied and the supply port is positioned on a side of the cylinder such that the cylinder extends above and below the supply port;
   a spiral screw configured to rotate inside the cylinder;
   a nozzle configured to discharge the material plasticized inside the cylinder;
   a heating unit provided between the supply port in the cylinder and the nozzle;
   a drive motor configured to convert electricity into motive force to a rotation shaft to rotate the rotation shaft, that rotational shaft extending downwards from the drive motor; and
   a case comprising a motor case portion that defines a hollow portion configured to accommodate at least a part of the drive motor, the motor case portion accommodating the drive motor higher than where the rotation shaft extends downwards from the drive motor, wherein:
   the case includes a first refrigerant flow path formed therein configured to dissipate at least a portion of heat generated by the drive motor, the first refrigerant flow path extending higher than where the rotation shaft extends down from the drive motor;
   the cylinder includes a second refrigerant flow path formed therein, and
   the second refrigerant flow path has different densities in different areas at a same distance to the nozzle.

2. The plasticization device according to claim 1, wherein the cylinder includes a first portion and a second portion, the first portion includes the supply port and the second refrigerant flow path and the second portion is provided with the heating unit.

3. The plasticization device according to claim 2, wherein the second refrigerant flow path communicates with the first refrigerant flow path.

4. The plasticization device according to claim 3, wherein the first and second refrigerant flow paths are configured so that a refrigerant flows from the second refrigerant flow path to the first refrigerant flow path,
   the first refrigerant flow path and the second refrigerant flow path are both connected to a refrigerant supply unit, and
   the second refrigerant flow path is configured to receive a refrigerant from the refrigerant supply unit and supply the refrigerant to the first refrigerant flow path, such that the refrigerant is configured to circulate (1) from the refrigerant supply unit to the second refrigerant flow path, (2) from the second refrigerant flow path to the first refrigerant flow path, and (3) from the first refrigerant flow path back to the refrigerant supply unit.

5. The plasticization device according to claim 2, wherein the first portion of the cylinder includes a first region and a second region that has a longer distance from the supply port than a distance between the first region and the supply port, and the second refrigerant flow path is disposed more densely in the first region of the first portion of the cylinder than in the second region of the first portion of the cylinder.

6. The plasticization device according to claim 2, wherein the first portion of the cylinder includes a third region and a fourth region that has a longer distance from the second portion of the cylinder than a distance between the third region and the second portion of the cylinder, and the second refrigerant flow path is disposed more densely in the third region of the first portion of the cylinder than in the fourth region of the first portion of the cylinder.

7. The plasticization device according to claim 1, wherein the cylinder includes a heat insulating portion between the supply port and the heating unit and the heat insulating portion has a lower heat conductivity than the cylinder.

8. A three-dimensional shaping device comprising:
a cylinder having a supply port through which a material is supplied and the supply port is positioned on a side of the cylinder such that the cylinder extends above and below the supply port;
a spiral screw configured to rotate inside the cylinder;
a nozzle configured to discharge the material plasticized inside the cylinder towards a stage;
a heating unit provided between the supply port in the cylinder and the nozzle;
a drive motor configured to convert electricity into motive force to a rotation shaft to rotate the rotation shaft, that rotational shaft extending downwards from the drive motor;
a case comprising a motor case portion that defines a hollow portion configured to accommodate at least a part of the drive motor, the motor case portion accommodating the drive motor higher than where the rotation shaft extends downwards from the drive motor, wherein:
the case includes a refrigerant flow path that is provided therein configured to dissipate at least a portion of heat generated by the drive motor, the first refrigerant flow path extending higher than where the rotation shaft extends down from the drive motor;
the cylinder includes a second refrigerant flow path formed therein, and
the second refrigerant flow path has different densities in different areas at a same distance to the nozzle; and
a control unit configured to control the drive motor and the heating unit.

9. An injection molding device, comprising:
a cylinder having a supply port through which a material is supplied and the supply port is positioned on a side of the cylinder such that the cylinder extends above and below the supply port;
a spiral screw configured to rotate inside the cylinder;
a nozzle configured to discharge the material plasticized inside the cylinder towards a mold;
a heating unit provided between the supply port in the cylinder and the nozzle;
a drive motor configured to convert electricity into motive force to a rotation shaft to rotate the rotation shaft, that rotational shaft extending downwards from the drive motor;
a case comprising a motor case portion that defines a hollow portion configured to accommodate at least a part of the drive motor, the motor case portion accommodating the drive motor higher than where the rotation shaft extends downwards from the drive motor, wherein:
the case includes a refrigerant flow path that is provided therein configured to dissipate at least a portion of heat generated by the drive motor, the first refrigerant flow path extending higher than where the rotation shaft extends down from the drive motor,
the cylinder includes a second refrigerant flow path formed therein, and
the second refrigerant flow path has different densities in different areas at a same distance to the nozzle; and
a control unit configured to control the drive motor and the heating unit.

\* \* \* \* \*